(12) United States Patent
Mori

(10) Patent No.: US 8,231,166 B2
(45) Date of Patent: Jul. 31, 2012

(54) VEHICLE FRONT SIDE MEMBER

(75) Inventor: Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 473 days.

(21) Appl. No.: 12/527,944

(22) PCT Filed: Feb. 7, 2008

(86) PCT No.: PCT/IB2008/000602
§ 371 (c)(1),
(2), (4) Date: Aug. 20, 2009

(87) PCT Pub. No.: WO2008/102262
PCT Pub. Date: Aug. 28, 2008

(65) Prior Publication Data
US 2010/0096887 A1 Apr. 22, 2010

(30) Foreign Application Priority Data

Feb. 23, 2007 (JP) .................................. 2007-044348

(51) Int. Cl.
*B60N 99/00* (2006.01)
(52) U.S. Cl. ................ 296/187.09; 296/203.02; 280/784
(58) Field of Classification Search ............. 296/187.09, 296/203.01, 203.02, 204, 205; 280/124.109, 280/781, 784
See application file for complete search history.

(56) References Cited

U.S. PATENT DOCUMENTS

| 2006/0001228 A1 | 1/2006 | Yoshimura |
| 2006/0028052 A1 | 2/2006 | Dandekar |

FOREIGN PATENT DOCUMENTS

| GB | 2 318 552 A | 4/1998 |
| JP | 04-008677 A | 1/1992 |
| JP | 04-067577 U | 6/1992 |
| JP | 05-319308 A | 12/1993 |
| JP | 2003-261072 A | 9/2003 |
| JP | 2004-075021 A | 3/2004 |
| JP | 2004-189118 A | 7/2004 |
| JP | 2005-022617 A | 1/2005 |
| JP | 2006-076504 A | 3/2006 |
| WO | WO 2004/098820 A | 11/2004 |

*Primary Examiner* — Lori Lyjak
(74) *Attorney, Agent, or Firm* — Kenyon & Kenyon LLP

(57) ABSTRACT

A member of a vehicle frame structure includes an extension portion that extends in a longitudinal direction and a kick portion positioned behind, and below the extension portion. Buckling lines are formed in parallel with each other in the extension portion, and each of the buckling lines is inclined such that a lower end is positioned ahead of an upper end in a side view. If a collision load is applied from a front side of a vehicle at the time of vehicle collision, the extension portion is deformed along the buckling lines, and a front end of the extension portion is displaced downward. Therefore, a vertical offset between the front end of the extension portion and the kick portion is reduced, thereby reducing a bending moment applied to the kick portion. Accordingly, the required yield strength of the kick portion can be set to a lower value.

7 Claims, 4 Drawing Sheets

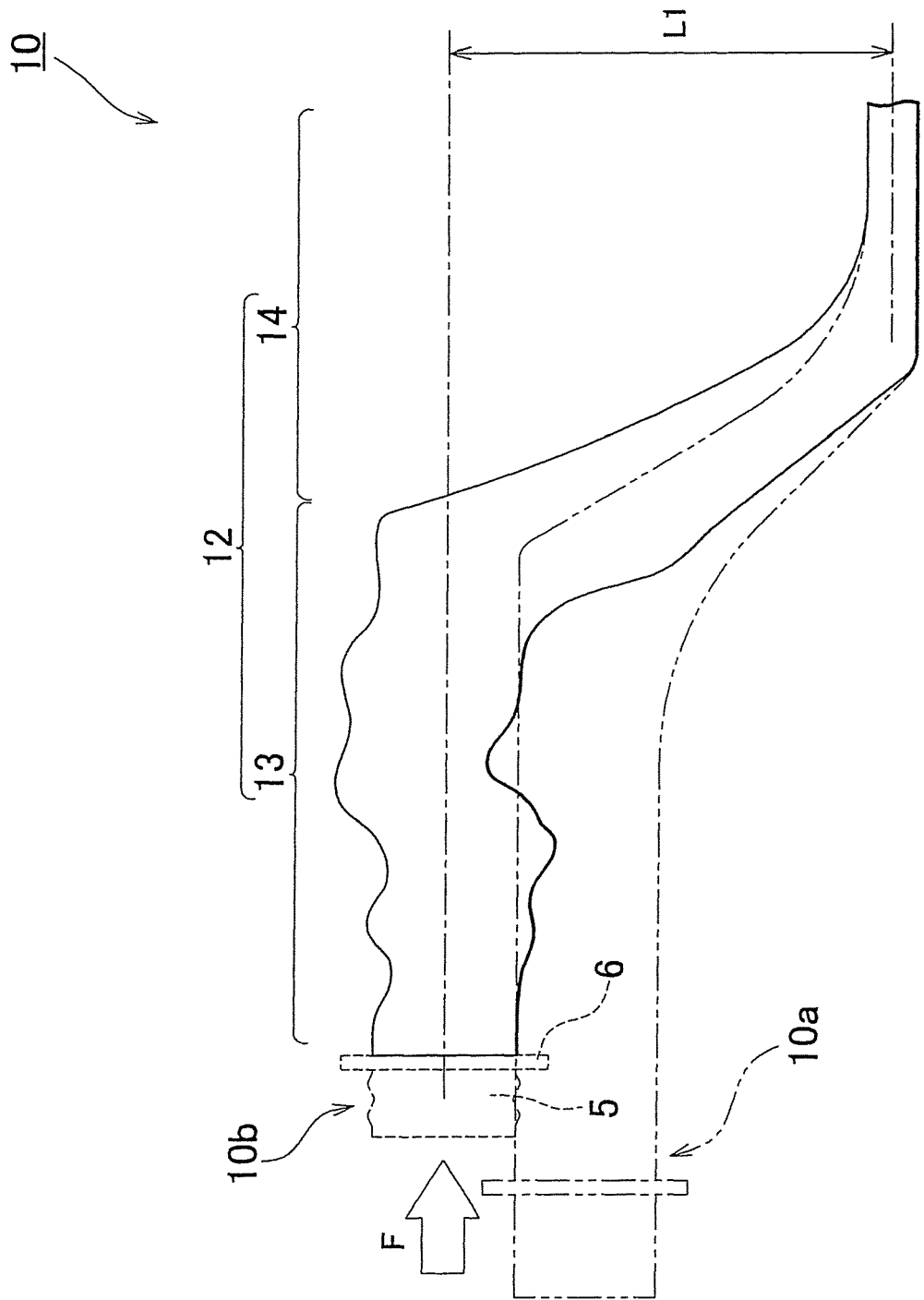

VEHICLE FRONT SIDE MEMBER

This is a 371 national phase application of PCT/IB2008/000602 filed 07 Feb. 2008, claiming priority to Japanese Patent Application No. 2007-044348 filed 23 Feb. 2007, the contents of which are incorporated herein by reference.

FIELD OF THE INVENTION

The invention relates to a front side member that constitutes a frame of a vehicle, such as an automobile.

BACKGROUND OF THE INVENTION

A vehicle frame structure, which includes front side members constituting a vehicle frame and load supporting means connected to the corresponding front side member, is available (for example, refer to Japanese Patent Application Publication No. 2005-22617 (JP-A-2005-22617)). In such a vehicle frame structure, at the time of vehicle collision, the load supporting means receives an upward tensile load applied to the front side member, and at the same time, the load supporting means suppresses the upward movement of a front end portion of the front side member. In this way, a vertical offset of the front end portion is reduced, thereby reducing a bending moment applied to the front side member.

However, in the aforementioned vehicle frame structure, it is necessary to provide the load supporting means, resulting in increase of the production cost and mass.

DISCLOSURE OF THE INVENTION

The invention provides a vehicle frame structure that is light and can be produced at low cost.

A front side member according to an aspect of the invention, which constitutes a frame of a vehicle, includes: an extension portion that extends in a longitudinal direction of the vehicle; and a kick portion that is positioned behind, and below the extension portion. A buckling line is formed in the extension portion. The buckling line is inclined such that a lower end of the buckling line is positioned ahead of an upper end of the buckling line in a side view.

With this configuration, at the time of vehicle collision, the front side member is deformed in a manner such that the extension portion is deformed along the buckling lines, and a front end of the extension portion is displaced downward. As a result, a vertical offset of the front end of the extension portion with respect to the kick portion is reduced when the front side member is deformed at the time of vehicle collision, and thus, a bending moment applied to the kick portion is reduced. Therefore, according to the invention, there is no need for providing load supporting means, and the required yield strength of the kick portion can be set to a low value. Accordingly, the vehicle frame structure is light and can be produced at low cost.

In the aspect, an even number of the buckling lines may be formed in the extension portion. With this configuration, when the extension portion is deformed along the buckling lines at the time of vehicle collision, a portion of the extension portion positioned between the front end and the front buckling line is kept extended in the longitudinal direction of the vehicle (in other words, the portion of the extension portion positioned between the front end and the front buckling line is displaced downward in parallel). Accordingly, the bending moment applied to the kick portion can be reduced to a desired value.

Further, the buckling line may be formed by mutually joining a plurality of members with different strengths. The plurality of members with different strengths may be made of different materials or may have different wall thicknesses.

According to the invention, the vehicle frame structure is light and can be produced at low cost.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 4 is a side view illustrating the condition of a conventional vehicle frame structure at the time of vehicle collision.

DETAILED DESCRIPTION OF THE PREFERRED EMBODIMENTS

Figure 1:
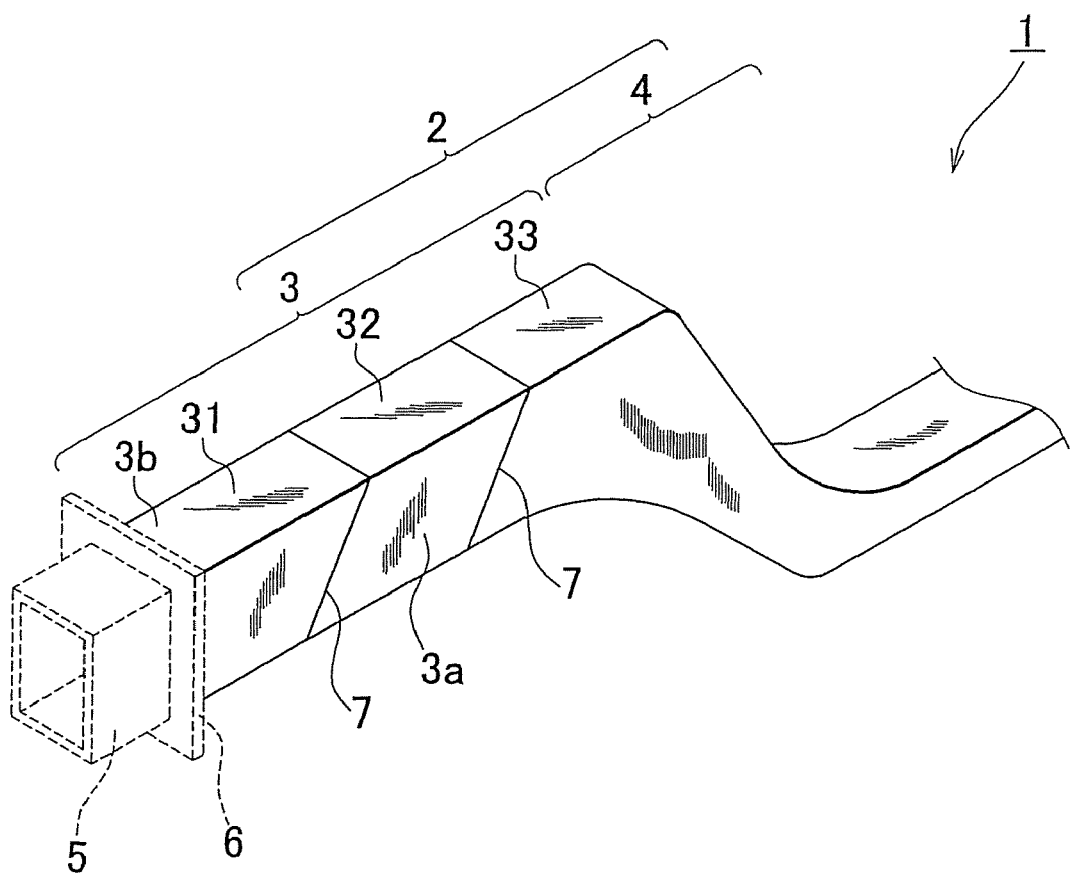
FIG. 1 is a perspective view showing a vehicle frame structure according to an embodiment of the invention.

An embodiment of the invention will be described in detail with reference to the attached drawings. Note that, in the description below, the terms "upper" and "lower" indicate "upper" and "lower" in a height direction of a vehicle, and the term "front" and "rear" indicate "front" and "rear" in a longitudinal direction of the vehicle. Further, in the description of the drawings, the same and corresponding components are denoted by the same reference numerals, and the description thereof will not be repeated.

FIG. 1 is a perspective view showing a vehicle frame structure according to an embodiment of the invention. As shown in FIG. 1, a vehicle frame structure 1 includes a pair of front side members 2. The pair of front side members 2 form left and right frames of a body of a vehicle, such as an automobile, and are disposed at both sides in a width direction of the vehicle so that an engine (not shown) is interposed between the pair of front side members 2. Each of the front side members 2 is a hollow member that has a hollow rectangular cross section, and includes an extension portion 3 that extends in a longitudinal direction of the vehicle and a kick portion 4 positioned behind, and below the extension portion 3.

The extension portion 3 is deformed due to buckling or the like by a collision load applied at the time of vehicle collision, and thus the extension portion 3 absorbs shock. The extension portion 3 linearly extends in a substantially horizontal direction. A crash box 5 is connected to a front end 3b of the extension portion 3 through a flange 6, and the crash box 5 functions as a shock absorbing member. The kick portion 4 is continuous with a rear end of the extension portion 3. The kick portion 4 includes a bent portion that is bent downward and toward the rear of the vehicle, and a straight portion that extends toward the rear of the vehicle. A rear end of the kick portion 4 is connected to, for example, a rocker panel (not shown) of the vehicle.

Buckling lines 7, 7 are formed in parallel with each other in the extension portion 3 of the front side member 2, and each of the buckling lines 7 is inclined in a manner such that a lower end of the buckling line 7 is positioned ahead of an upper end of the buckling line 7 in a side view. The bucking lines 7 in the embodiment are boundaries between members 31, 32, 33 that are mutually joined by laser welding or the like. The members 31, 32, 33 are made of different materials with different yield strengths (yield stresses). In other words, the buckling lines 7 are formed by mutually joining a plurality of members with different strengths. The strength of each of the members 31, 32, 33 is set so that the strength increases from the member 31 to the member 33. Thus, the extension portion 3 is divided into three portions that have different strengths by the buckling lines 7 so that the strength increases from the portion closest to the front of the vehicle to the portion closest to the rear of the vehicle.

Alternatively, the buckling lines 7 may be formed by mutually joining a plurality of members with different wall thicknesses. Further, each of the buckling lines 7 may be a groove or bead that is formed on a side surface 3a of the extension portion 3 to be inclined in a manner such that a lower end of the groove is positioned ahead of an upper end of the groove in a side view.

Next, the case where the collision load is applied from the front side of the vehicle will be described. FIG. 4 is a side view illustrating a conventional vehicle frame structure 10 at the time of vehicle collision. A vehicle frame structure 10a shown by the two-dotted line in FIG. 4 shows the condition of the conventional vehicle frame structure 10 before vehicle collision, and a vehicle frame structure 10b shows the condition of the conventional vehicle frame structure 10 at the time of vehicle collision. As shown in FIG. 4, when a collision load F is applied from the front side of the vehicle, a front side member 12 of the conventional vehicle frame structure 10 tends to be deformed upward, and a vertical offset (moment arm) L1 of a front end of an extension portion 13 with respect to a kick portion 14 may become large. Therefore, there may be a need for a large number of reinforcement members in the kick portion 14, resulting in increase of the production cost and the weight of the vehicle frame structure 10.

Figure 2:
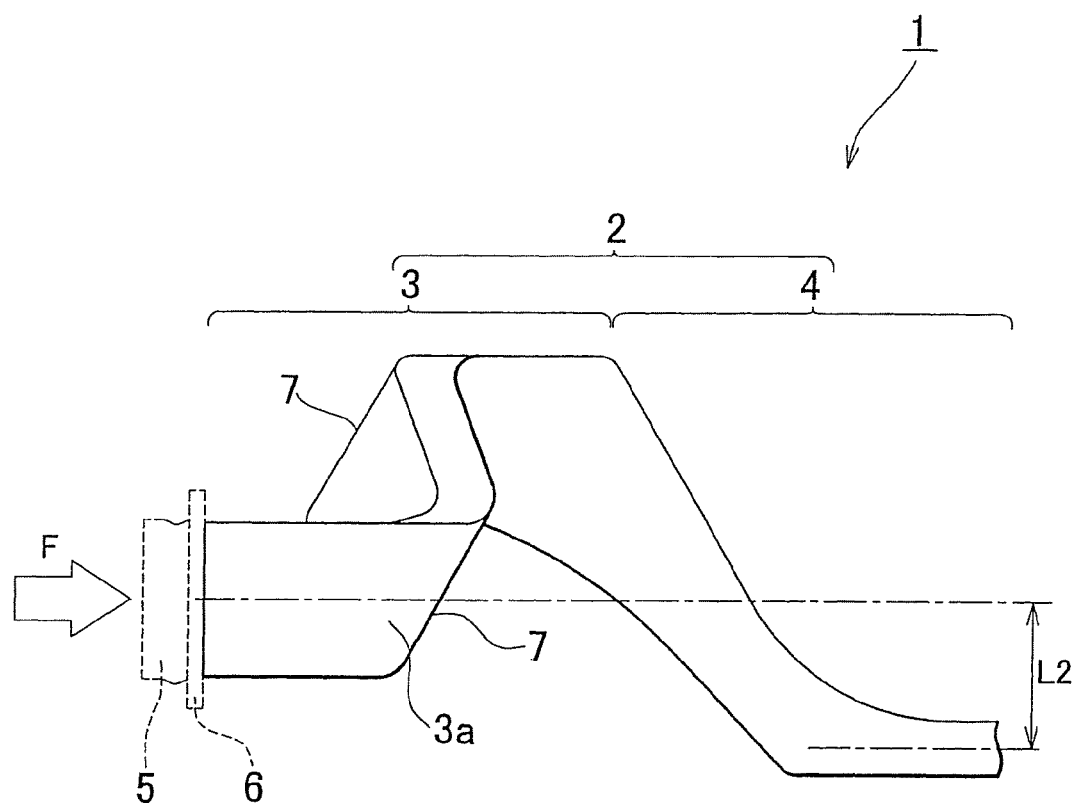
FIG. 2 is a side view illustrating the condition of the vehicle frame structure shown in FIG. 1 at the time of vehicle collision.

In contrast, in the vehicle frame structure 1 according to the embodiment, the buckling lines 7 are formed in parallel with each other in the extension portion 3 of the front side member 2, and each of the buckling lines 7 is inclined in a manner such that the lower end of the buckling line 7 is positioned ahead of the upper end of the buckling line 7 in the side view, as described above. Therefore, as shown in FIG. 2, if the collision load F is applied from the front side of the vehicle at the time of vehicle collision, the front side member 2 is deformed in a manner such that the extension portion 3 is deformed along the buckling lines 7, and the front end of the extension portion 3 is displaced downward.

Therefore, in the vehicle frame structure 1, a vertical offset L2 between the front end of the extension portion 3 and the kick portion 4 is reduced when the front side member 2 is deformed at the time of vehicle collision, and thus, a bending moment applied to the kick portion 4 is reduced. This makes it possible to set the required yield strength of the kick portion 4 to a low value. This also makes it possible to eliminate the need for providing a large number of reinforcement members in the kick portion 4, thereby reducing the wall thickness of the kick portion 4 and further simplifying the shape and configuration of the kick portion 4. Further, there is no need for providing load supporting means for receiving an upward tensile load. Thus, the vehicle frame structure 1 is light and can be produced at low cost.

Further, in the vehicle frame structure 1, the two buckling lines 7 are framed in parallel with each other in the extension portion 3, as described above. Therefore, at the time of vehicle collision, the extension portion 3 is bent along the front and rear buckling lines 7, and thus, a portion of the extension portion 3 positioned behind the front buckling line 7 is folded, while a portion of the extension portion 3 positioned between the front end 3b and the front buckling line 7 is kept extended in the longitudinal direction of the vehicle. Accordingly, the bending moment applied to the kick portion 4 can be reduced to a desired value.

Figure 3:
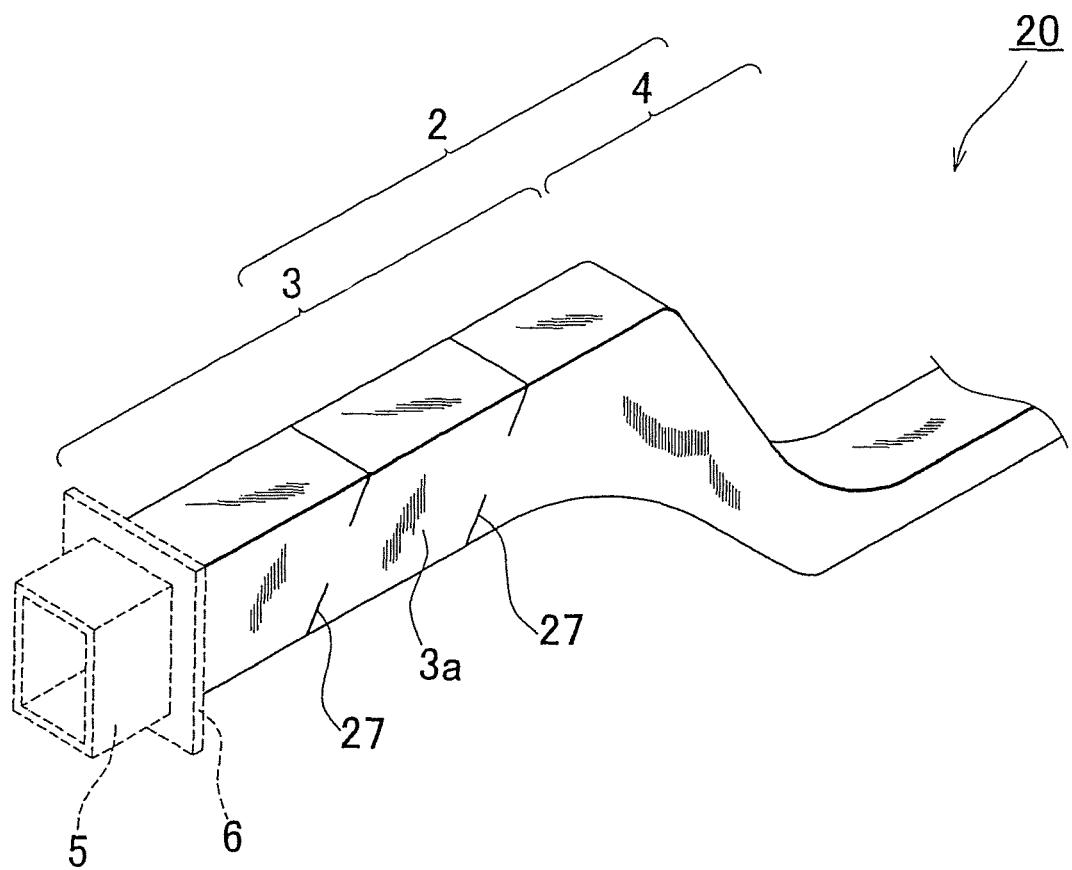
FIG. 3 is a perspective view showing a modification example of a vehicle frame structure.

As shown in FIG. 3, as a modification example, a vehicle frame structure 20 may be configured to include the extension portion 3 in which discontinuous buckling lines 27 are formed in parallel with each other. Alternatively, depending on the conditions, the buckling lines may be formed at four corners of each of a plurality of cross sections of the extension portion 3 taken at different positions so that the buckling lines at one position are arranged in parallel with the buckling lines at the position next to the one position in a side view. In these cases, the same and equivalent effects as the aforementioned effects can be obtained. More specifically, the front side member is deformed so that the front end of the extension portion is displaced downward at the time of vehicle collision, and the required yield strength of the kick portion can be set to a low value. Accordingly, the vehicle frame structure is light and can be produced at low cost.

The embodiment of the invention is described as above. However, the invention is not limited to the aforementioned embodiment.

For example, in the aforementioned embodiment, preferably, the buckling lines are inclined at the same inclination angle so that the buckling lines are arranged in parallel with each other. However, the buckling lines may be inclined at inclination angles that are different to each other. Thus, deformation of the front side member at the time of vehicle collision can be controlled by adjusting the inclination angles at which the buckling lines are inclined and the positional relationship between the buckling lines (that is, by adjusting the angle formed between the buckling lines). Further, the buckling lines may be formed only on an inner surface of the extension portion 3, so that the buckling lines do not appear on an outer surface of the extension portion 3.

Further, in the aforementioned embodiments, the two buckling lines are arranged in parallel with each other in a side view. However, the number of the buckling lines may be three or more, as long as the buckling lines are arranged side by side in a side view. If an even number of the buckling lines are arranged side by side in a side view, the aforementioned effect, in which the portion of the extension portion 3 positioned between the front end 3b and the front buckling line 7 is kept extended in the longitudinal direction of the vehicle at the time of vehicle collision, is more significant.

The invention claimed is:

1. A front side member that constitutes a frame of a vehicle, comprising:
    an extension portion that extends in a longitudinal direction of the vehicle; and
    a kick portion that is positioned behind, and below the extension portion,
    wherein:
        a buckling line is formed in the extension portion;
        the buckling line is inclined such that a lower end of the buckling line is positioned ahead of an upper end of the buckling line in a side view;
        the buckling line is formed by mutually joining a plurality of members with different strengths.

2. The front side member according to claim 1, wherein an even number of the buckling lines are formed in the extension portion.

3. A front side member that constitutes a frame of a vehicle, comprising:
- an extension portion that extends in a longitudinal direction of the vehicle; and
- a kick portion that is positioned behind, and below the extension portion, wherein:
- a buckling line is formed in the extension portion;
- the buckling line is inclined such that a lower end of the buckling line is positioned ahead of an upper end of the buckling line in a side view;
- the buckling line is formed by mutually joining a plurality of members with different strengths; and
- strength of each of the plurality of members is set so that the strength increases from the member closest to a front of the vehicle to the member closest to a rear of the vehicle.

4. The front side member according to claim 1, wherein
the extension portion includes a front end portion positioned in front of the buckling line; and
the extension portion is deformed along the buckling line so as to be folded in a vehicle width direction at the time of vehicle collision, thereby the front end portion approaches to a rear end portion of the kick portion in a height direction.

5. The front side member according to claim 1, wherein
the extension portion includes a front end portion positioned in front of the buckling line; and
a portion of the extension portion positioned behind the buckling line is folded at the time of vehicle collision, while the front end portion is kept extended in the longitudinal direction of the vehicle.

6. The front side member according to claim 1, wherein the buckling lines are formed in parallel with each other in the extension portion.

7. A front side member that constitutes a frame of a vehicle, comprising:
- an extension portion that extends in a longitudinal direction of the vehicle; and
- a kick portion that is positioned behind, and below the extension portion,
- wherein the extension portion is deformed so as to be folded in a vehicle width direction at the time of vehicle collision, thereby a front end portion of the extension portion approaches to a rear end portion of the kick portion in a height direction, and
- wherein a buckling line, formed in the extension portion, is formed by mutually joining a plurality of members with different strengths.

* * * * *